US012378100B2

(12) United States Patent
O'Grady

(10) Patent No.: US 12,378,100 B2
(45) Date of Patent: Aug. 5, 2025

(54) MODULAR LIFT SYSTEM

(71) Applicant: Automatic Devices Company, Allentown, PA (US)

(72) Inventor: Kevin O'Grady, Allentown, PA (US)

(73) Assignee: Automatic Devices Company, Allentown, PA (US)

( * ) Notice: Subject to any disclaimer, the term of this patent is extended or adjusted under 35 U.S.C. 154(b) by 240 days.

(21) Appl. No.: 18/209,320

(22) Filed: Jun. 13, 2023

(65) Prior Publication Data

US 2023/0399209 A1 Dec. 14, 2023

Related U.S. Application Data

(63) Continuation-in-part of application No. 16/592,546, filed on Oct. 3, 2019, now Pat. No. 11,772,942.

(60) Provisional application No. 62/879,041, filed on Jul. 26, 2019.

(51) Int. Cl.

*B66D 1/00* (2006.01)
*B66D 1/20* (2006.01)
*B66D 1/26* (2006.01)
*B66D 1/30* (2006.01)

(52) U.S. Cl.

CPC ................ *B66D 1/30* (2013.01); *B66D 1/20* (2013.01); *B66D 1/26* (2013.01)

(58) Field of Classification Search

CPC ... B66D 1/12; B66D 1/26; B66D 1/28; B66D 1/30; B66D 1/38; B66D 1/39; E04C 3/08; A63J 1/028; B65H 75/425; B66C 13/06

See application file for complete search history.

(56) References Cited

U.S. PATENT DOCUMENTS 505,639 A * 9/1893 Rasch ...................... B66D 1/26 254/300
952,742 A 3/1910 Iwahori
1,419,129 A 6/1922 Fitch
1,536,383 A 5/1925 Gordon
1,555,544 A 9/1925 Anthony
1,913,508 A 6/1933 Roy
2,053,976 A 9/1936 Stahl
2,157,153 A 5/1939 Troche
2,164,128 A 6/1939 Medenwald
2,420,594 A 5/1947 Manley
2,421,788 A 6/1947 Henry
2,603,851 A 7/1952 Hawkins
2,846,162 A 8/1958 Allin et al.
3,056,480 A 10/1962 Charles (Continued)

FOREIGN PATENT DOCUMENTS

CN 1096762 A 12/1994
CN 108584735 A 9/2018

(Continued)

*Primary Examiner* — Emmanuel M Marcelo
(74) *Attorney, Agent, or Firm* — Suiter Swantz IP

(57) ABSTRACT

A modular lift system may include, but is not limited to: one or more lift segments each including: a lift-truss structure; and a drive shaft having at least one end-coupler, at least one lift assembly coupled to the lift-truss structure, and at least one drive segment including: a drive-truss structure; a drive motor coupled to the drive-truss structure; and a drive-coupler attached to the drive motor and configured to engage the end-coupler of the drive shaft.

5 Claims, 23 Drawing Sheets

(56) References Cited

U.S. PATENT DOCUMENTS

| | | | | |
|---|---|---|---|---|
| 3,262,679 | A | 7/1966 | Eggleton et al. | |
| 3,467,359 | A | 9/1969 | Durand | |
| 3,481,557 | A | 12/1969 | Miller | |
| 3,582,011 | A | 6/1971 | Murray | |
| 3,809,422 | A | 5/1974 | Schlough | |
| 3,934,854 | A | 1/1976 | Goode | |
| 4,881,548 | A | 11/1989 | Kramer | |
| 5,125,628 | A | 6/1992 | Rempinski et al. | |
| 5,346,153 | A | 9/1994 | Ebey | |
| 5,361,565 | A * | 11/1994 | Bayer | B66C 13/26 254/273 |
| 5,988,095 | A | 11/1999 | Kallenberger | |
| 6,009,927 | A | 1/2000 | Peters | |
| 6,457,902 | B1 | 10/2002 | Artzberger et al. | |
| 6,520,485 | B1 * | 2/2003 | Soot | B66D 1/39 160/331 |
| 6,719,241 | B2 | 4/2004 | Golden | |
| 6,991,064 | B2 * | 1/2006 | Ehrenleitner | B62D 65/18 182/141 |
| 7,108,248 | B2 | 9/2006 | Winter et al. | |
| 7,243,870 | B2 | 7/2007 | Pook et al. | |
| 7,484,712 | B2 | 2/2009 | Hossler | |
| 7,513,452 | B2 | 4/2009 | Ruan | |
| 8,099,913 | B1 * | 1/2012 | Dodd | A63J 1/02 52/79.5 |
| 9,051,696 | B1 | 6/2015 | Coats et al. | |
| 9,120,656 | B2 | 9/2015 | Yoder | |
| 9,815,670 | B2 | 11/2017 | Bauder | |
| 9,908,755 | B2 * | 3/2018 | Hoffend, III | A63J 1/02 |
| 10,246,293 | B2 | 4/2019 | Rekieta et al. | |
| 10,399,832 | B2 | 9/2019 | Hoffend, Jr. et al. | |
| 10,737,915 | B2 | 8/2020 | Mohr | |
| 10,807,841 | B2 | 10/2020 | Mupende et al. | |
| 10,815,102 | B2 | 10/2020 | Dodd | |
| 11,772,942 | B1 * | 10/2023 | O'Grady | B66D 1/28 254/362 |
| 2002/0104918 | A1 | 8/2002 | Zacharias | |
| 2006/0284151 | A1 * | 12/2006 | Hossler | B66D 1/36 254/278 |
| 2009/0127527 | A1 | 5/2009 | Hoffend, III | |
| 2012/0118397 | A1 | 5/2012 | Novotny et al. | |
| 2013/0075518 | A1 * | 3/2013 | Dodd | G03B 21/58 242/390 |
| 2013/0302133 | A1 * | 11/2013 | Davis | A63J 1/028 414/815 |
| 2016/0251201 | A1 * | 9/2016 | Cox | B66B 9/025 187/267 |
| 2016/0311634 | A1 | 10/2016 | Rekieta et al. | |
| 2017/0137266 | A1 | 5/2017 | Offend et al. | |
| 2021/0221660 | A1 | 7/2021 | Every et al. | |
| 2021/0347616 | A1 | 11/2021 | Jathmi | |

FOREIGN PATENT DOCUMENTS

| | | | | |
|---|---|---|---|---|
| CN | 108975193 | A | 12/2018 | |
| DE | 10217161 | B4 * | 9/2006 | B65G 47/61 |
| FR | 545613 | A | 10/1922 | |
| GB | 191126357 | A | 9/1912 | |
| GB | 177882 | A | 4/1922 | |
| JP | 03284600 | A | 12/1991 | |

* cited by examiner

MODULAR LIFT SYSTEM

CROSS-REFERENCE TO RELATED APPLICATIONS

The present application claims priority under 35 U.S.C. § 119 to U. S. Provisional Patent Application Ser. No. 62/879,041, filed Jul. 26, 2019, entitled MODULAR LIFT SYSTEM, naming Kevin O'Grady as inventor, which is incorporated herein by reference in the entirety.

The present application claims priority under 35 U.S.C. § 119 to U.S. patent application Ser. No. 16/592,546, filed Oct. 10, 2019, entitled MODULAR LIFT SYSTEM, naming Kevin O'Grady as inventor, which is incorporated herein by reference in the entirety.

TECHNICAL FIELD

The present disclosure generally relates to the field of lift systems, and more particularly, to a modular truss system for supporting, raising, and lowering performance and concert staging elements.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings. Referring generally to FIGS. 1 through 15, embodiments of the present disclosure are generally directed to a modular lift system 100.

Figure 1:
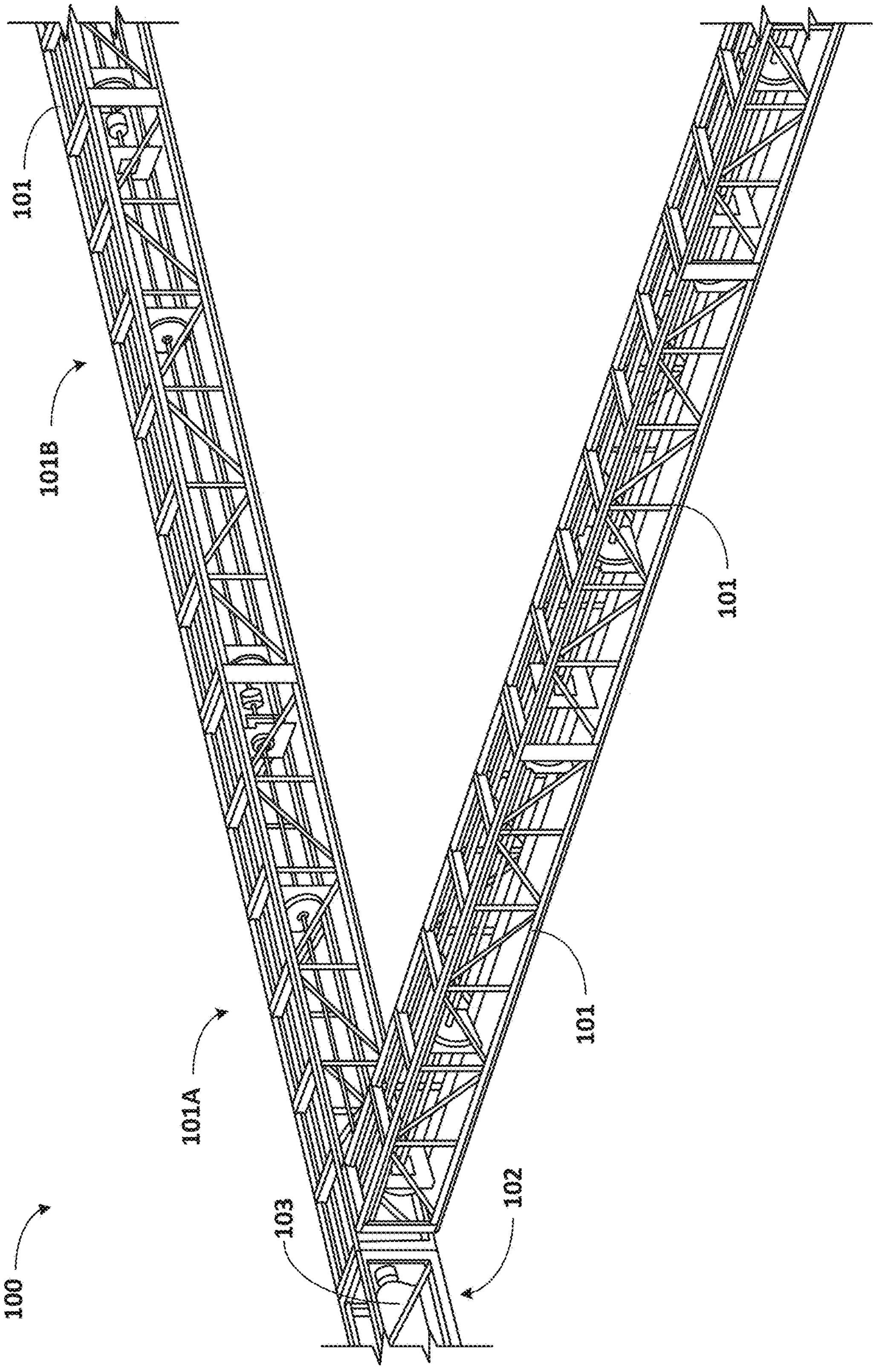
FIG. 1 shows a modular lift system.

Referring to FIG. 1, a modular lift system 100 is shown. One or more lift segments 101 (e.g., lift segment 101A and lift segment 101B may be joined together to create the modular lift system 100. A drive segment 102 including a drive motor 103 may be coupled to one or more of the lift segments 101 (e.g., lift segment 101A as shown in FIG. 1) to drive a lifting assembly of each of the lift segments 101 as further described below.

Figure 2:
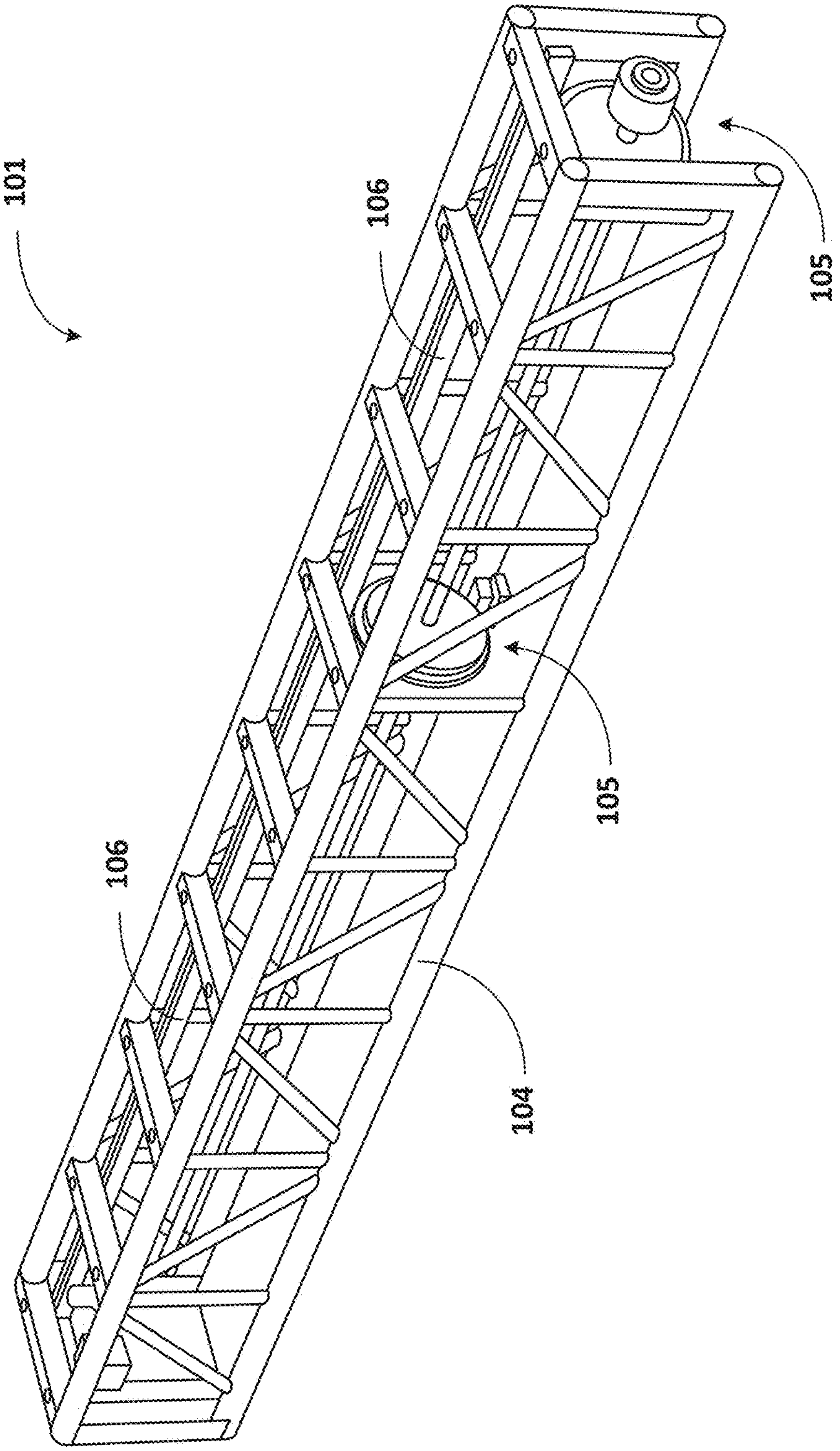
FIG. 2 shows a lift segment of a modular lift system.
Figure 3:
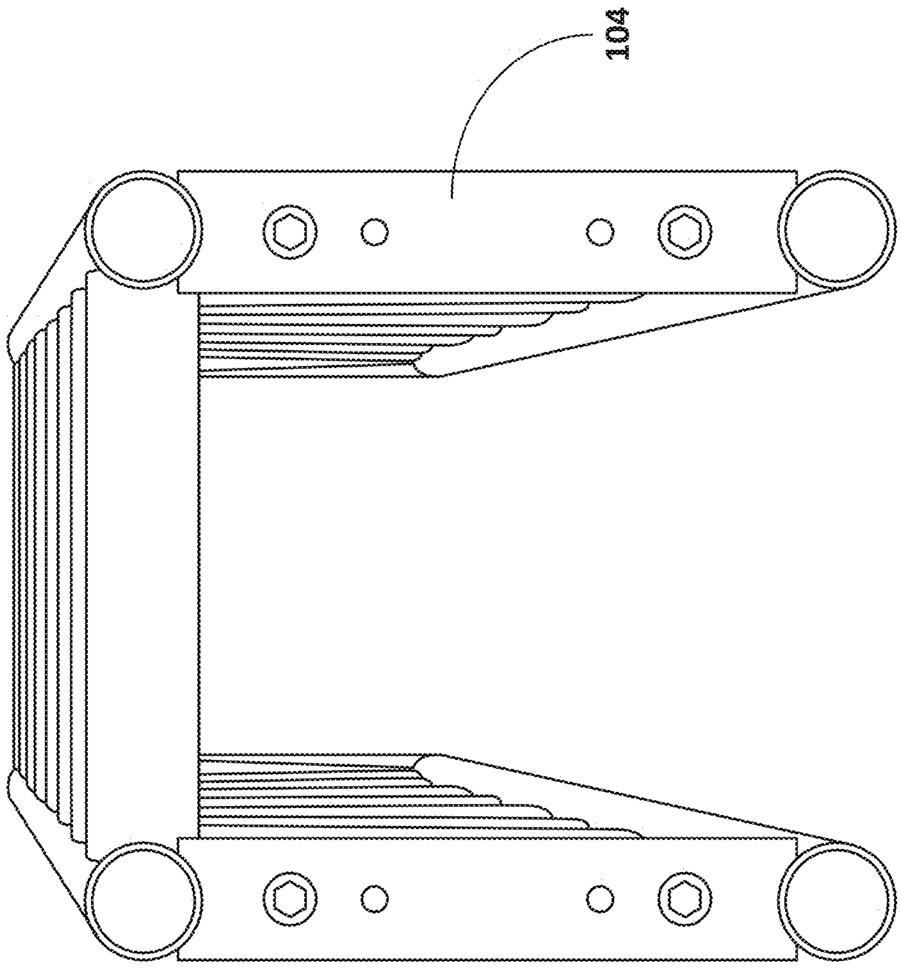
FIG. 3 shows truss structure of a lift segment.

Referring to FIG. 2, a detailed view of a lift segment 101 is shown. A lift segment 101 may include a truss structure 104 composed of one or more rigid members configured to support at least one lift assembly 105 within the truss structure 104. In one embodiment, the truss structure 104 may have an open-side configuration where at least one side of the truss structure 104 (e.g., the bottom side as shown in FIG. 3) is substantially free of intervening truss members. Such a configuration may allow a lift assembly 105 to positioned anywhere along the length of the lift segment 101 during assembly or adjustment of the modular lift system 100. A lift segment 101 may further include one or more support rails 106 running along a length of the lift segment 101 and configured to support a lift assembly 105. The truss structure 104 may be a 14" square truss design.

Figure 4:
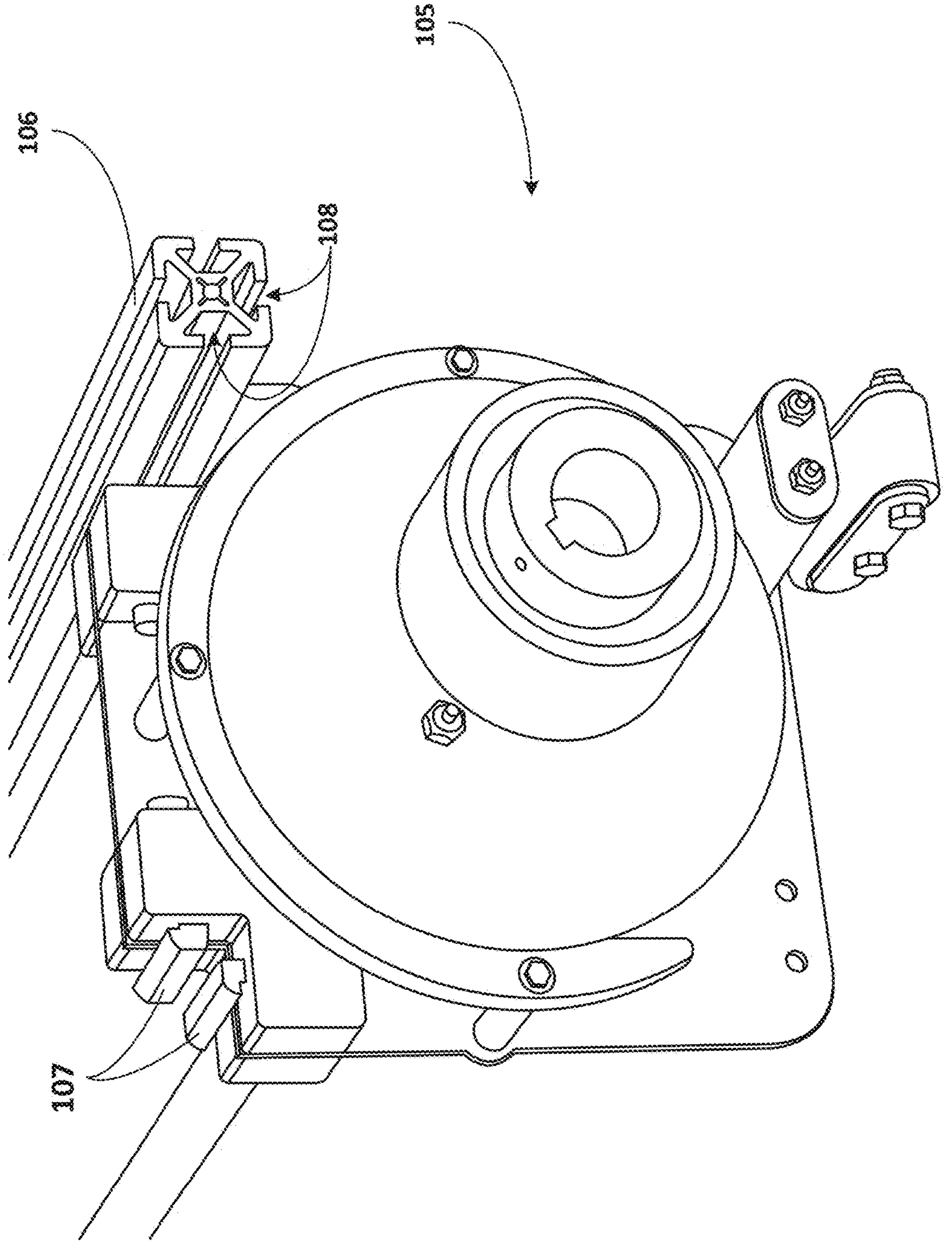
FIG. 4 shows a lift assembly.

Referring to FIG. 4, a lift assembly 105 may including one or more support rail fasteners 107 which serve to couple the lift assembly 105 to the support rails 106. For example, the support rails 106 may include one or more recessed grooves 108 configured to receive the support rail fasteners 107. The recessed grooves 108 may run along a length of the support rails 106 such that the support rail fasteners 107 are slidable within the recessed grooves 108 along the support rails 106 to position the lift assembly 105 anywhere along the length of a lift segment 101.

Figure 5:
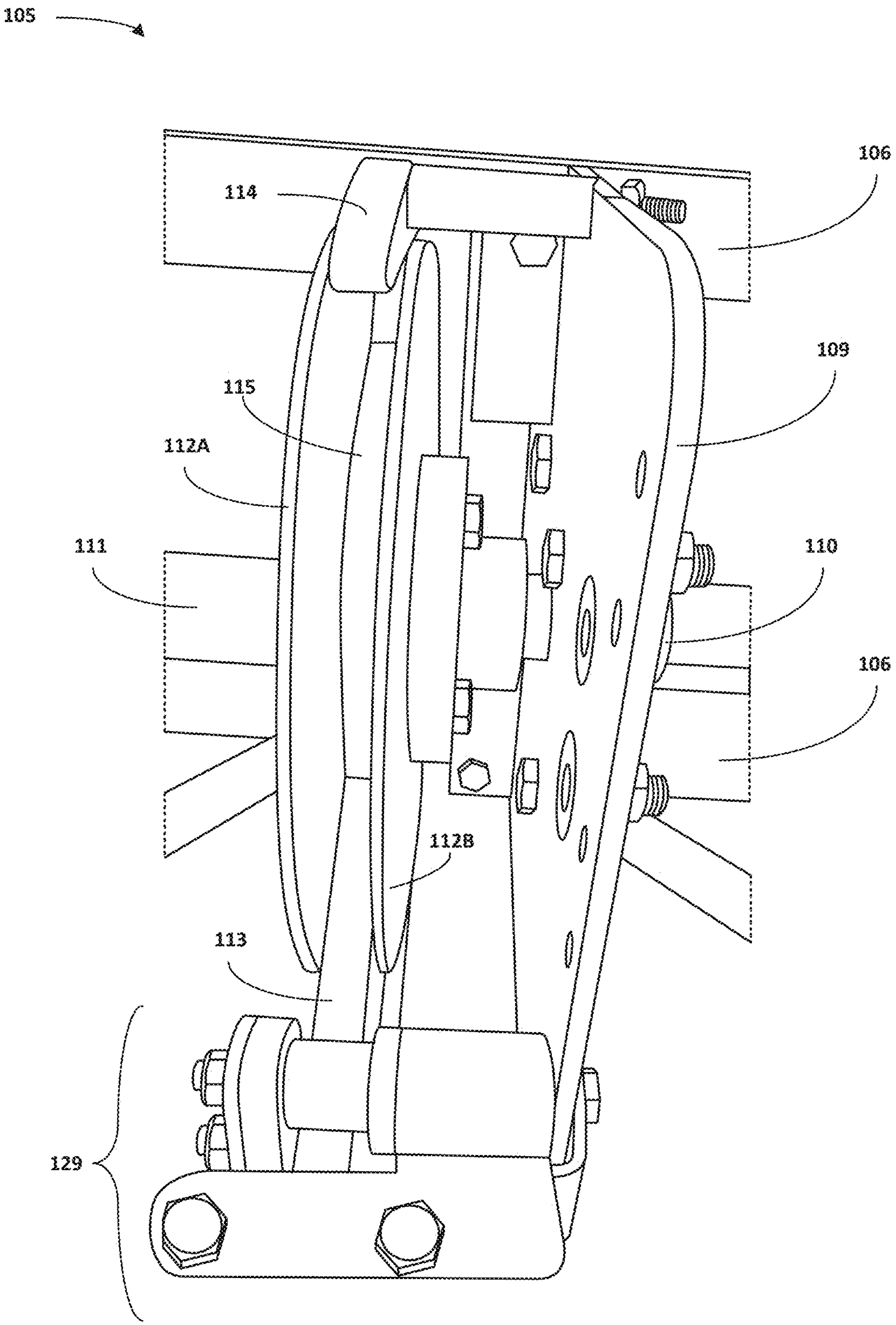
FIG. 5 shows a lift assembly.
Figure 6:
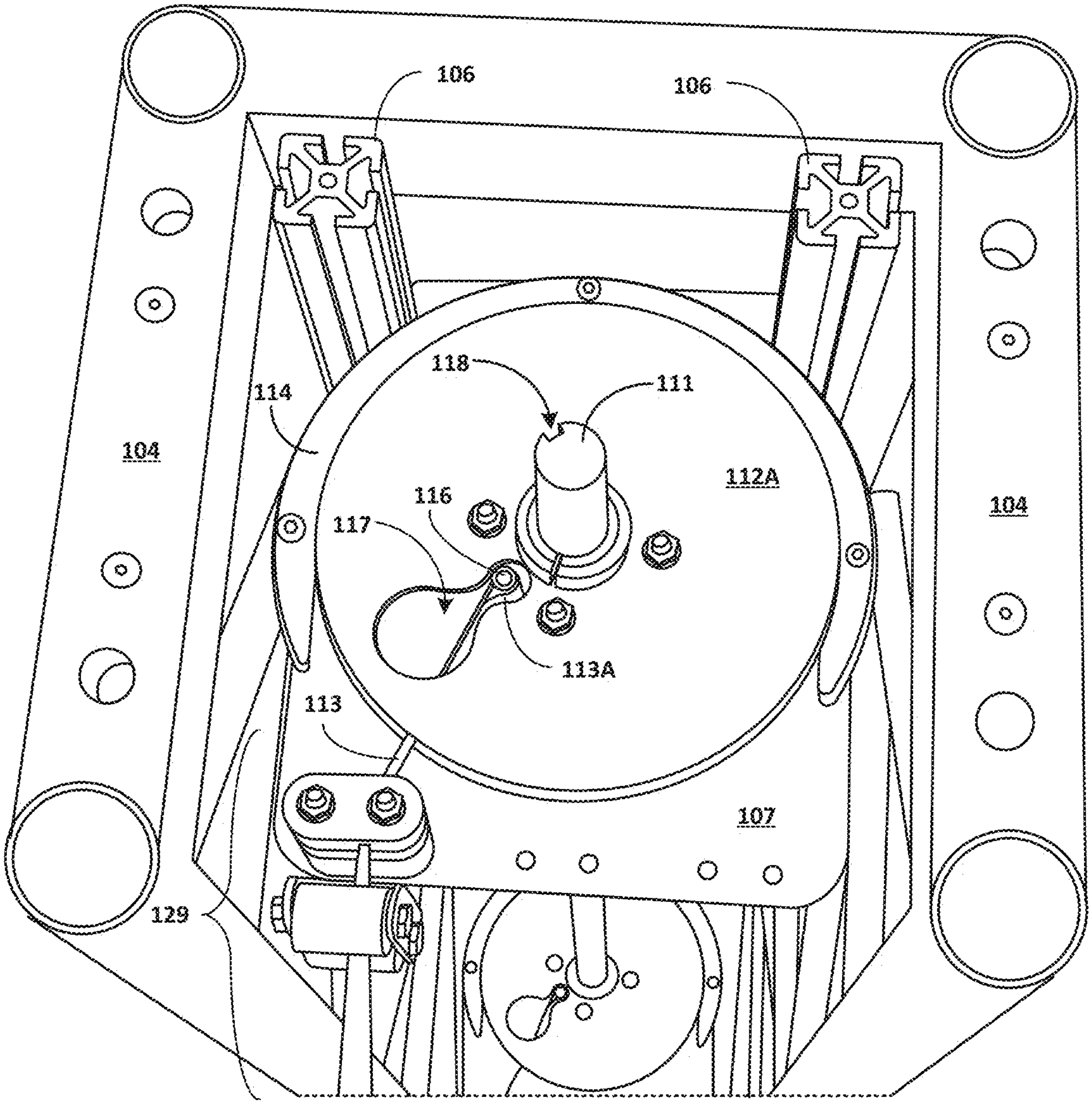
FIG. 6 shows a lift assembly.

FIGS. 5 and 6 show bottom and end views of a lift assembly 105, respectively. The lift assembly 105 may include a support bracket 109 from which the operably components of the lift assembly 105 may be suspended from the support rails 106 as described above. The support bracket 109 may include a bearing housing 110 configured to receive and allow rotation of a drive shaft 111 within a lift segment 101. The bearing housing 110 may utilize a linear bearing system which may allow for virtually limitless positioning of the drive shaft 111.

At least one lift line guide plate 112 (e.g., a first lift line guide plate 112A and second lift line guide plate 112B) may be operably coupled to the drive shaft 111 so as to rotate with the drive shaft 111 and retain a lift line 113 in a substantially fixed position during raising and lowering of the lift line 113. The lift assembly 105 may further include a lift line guide bracket 114 which may be statically coupled to the support bracket 109 to further secure the lift line 113 between a first lift line guide plate 112A and second lift line guide plate 112B.

Figure 7:
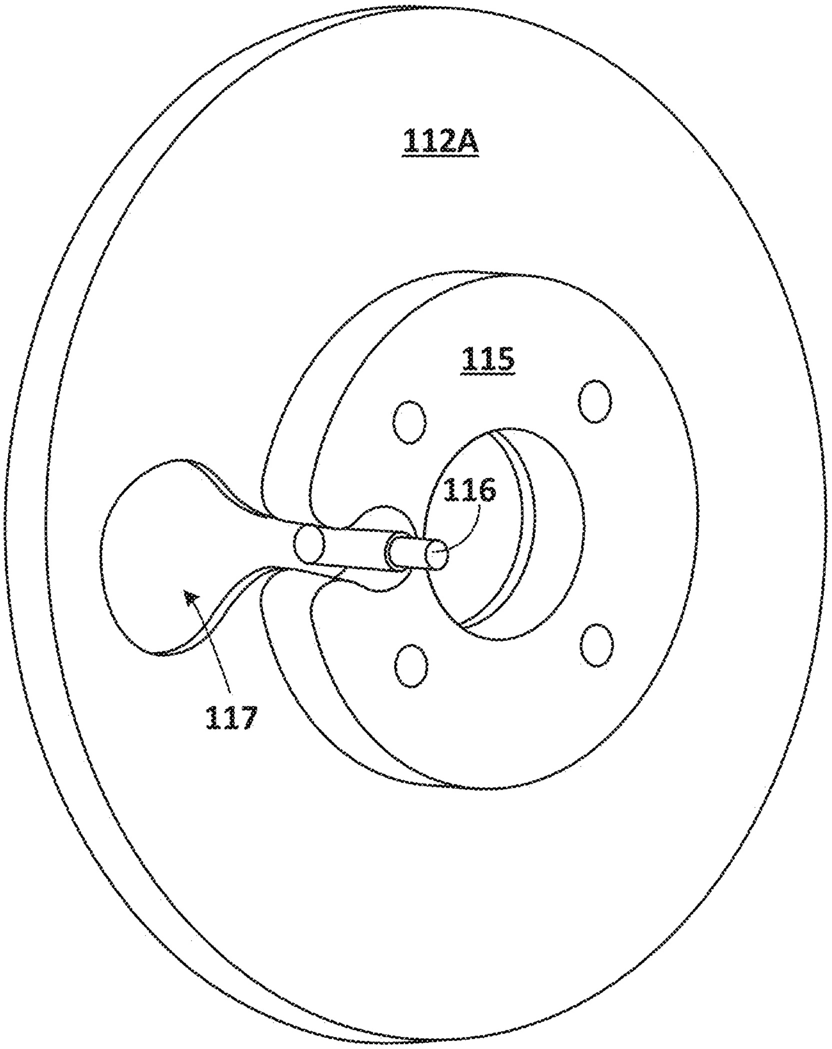
FIG. 7 shows a lift assembly.

Referring to FIGS. 5-7, a lift assembly 105 may include lift line drum 115 disposed between a first lift line guide plate 112A and a second lift line guide plate 112B. The lift assembly 105 may further include a lift line anchor pin 116 coupled to the second lift line guide plate 112B. The first lift line guide plate 112A may include an aperture 117 allowing access to the lift line anchor pin 116 by a user. For example, when a lift line 113 is routed between the first lift line guide plate 112A and a second lift line guide plate 1126, a user may grasp the lift line 113 through the aperture 117 and place a looped portion 113A of the lift line 113 over the lift line anchor pin 116 to secure an end of the lift line 113 to the lift assembly 105. Upon connection of the lift line 113 to the lift assembly 105, rotation of the drive shaft 111 will cause corresponding rotation of the lift line anchor pin 116 about the lift line drum 115 so as to wrap the lift line 113 around the lift line drum 115 thereby lifting an object attached to the end of the lift line 113 opposite the looped portion 113A of the lift line 113.

Figure 8:
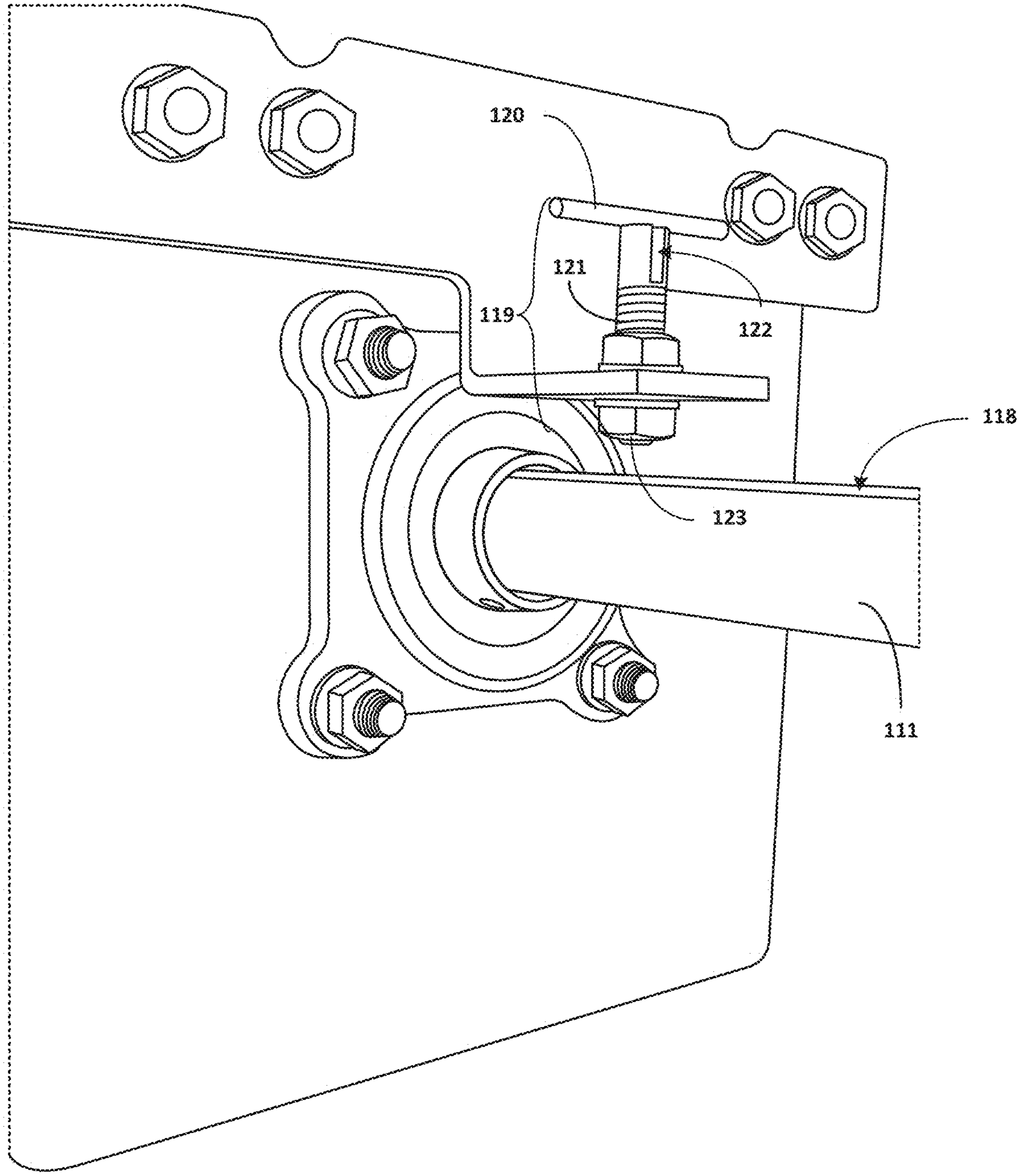
FIG. 8 shows a drive shaft locking mechanism.
Figure 9:
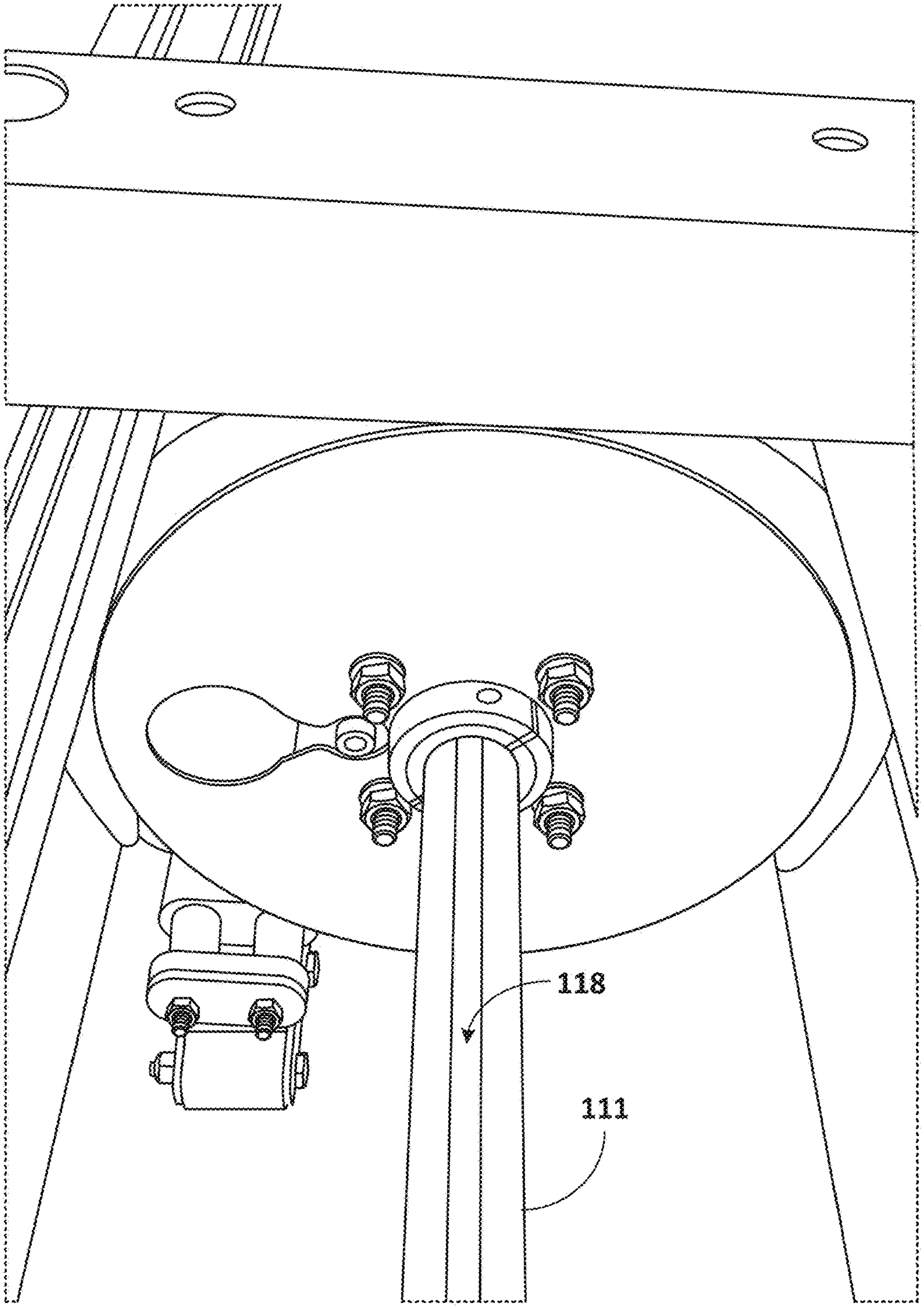
FIG. 9 shows a drive shaft locking mechanism.

Referring to FIGS. 6 and 8-9, a lift segment 101 may further include a drive shaft 111 having a drive shaft registration groove 118 disposed in its surface. The drive shaft registration groove 118 may serve to provide a rotational reference point such that the drive shaft 111 of multiple lift segments 101 may easily be brought into and retained in a common rotational state. Further, as shown in FIG. 8, a shaft registration lock 119 may engage the drive shaft registration groove 118 of a drive shaft 111 so as to retain the drive shaft 111 in a given rotational state. The shaft registration lock 119 may include a rotatable handle portion 120. Upon rotation of the handle portion 120 a certain amount (e.g., 90 degrees), a spring 121 may retract the handle portion 120 into a slot portion 122 thereby causing a locking pin 123 to be inserted into the drive shaft registration groove 118 locking the drive shaft 111 into a known rotational state (e.g., a load/unload position for transport of the lift segments 101). The drive shaft registration groove 118 may run the length of the drive shaft 111 such that a lift assembly 105 including a shaft registration lock 119 may be disposed at any location along the drive shaft 111. Similarly, a drive shaft portion of a drive motor 103 (not shown) of a drive segment 102 may, likewise, employ a drive shaft registration groove 118 and shaft registration lock 119 as described above to provide co-alignment functionality to all segments of the modular lift system 100.

Figure 10:
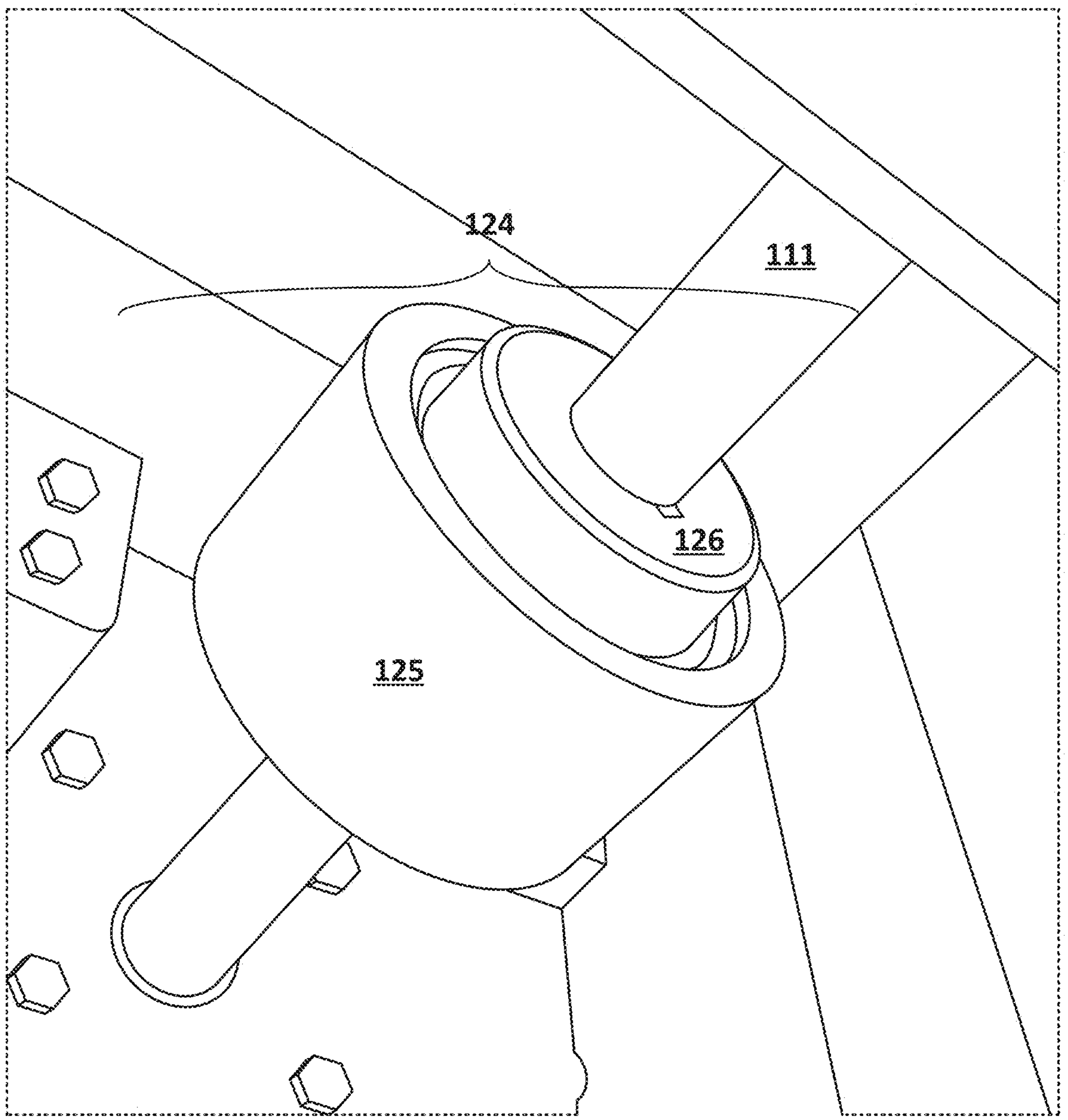
FIG. 10 shows drive shaft coupling mechanism.
Figure 11:
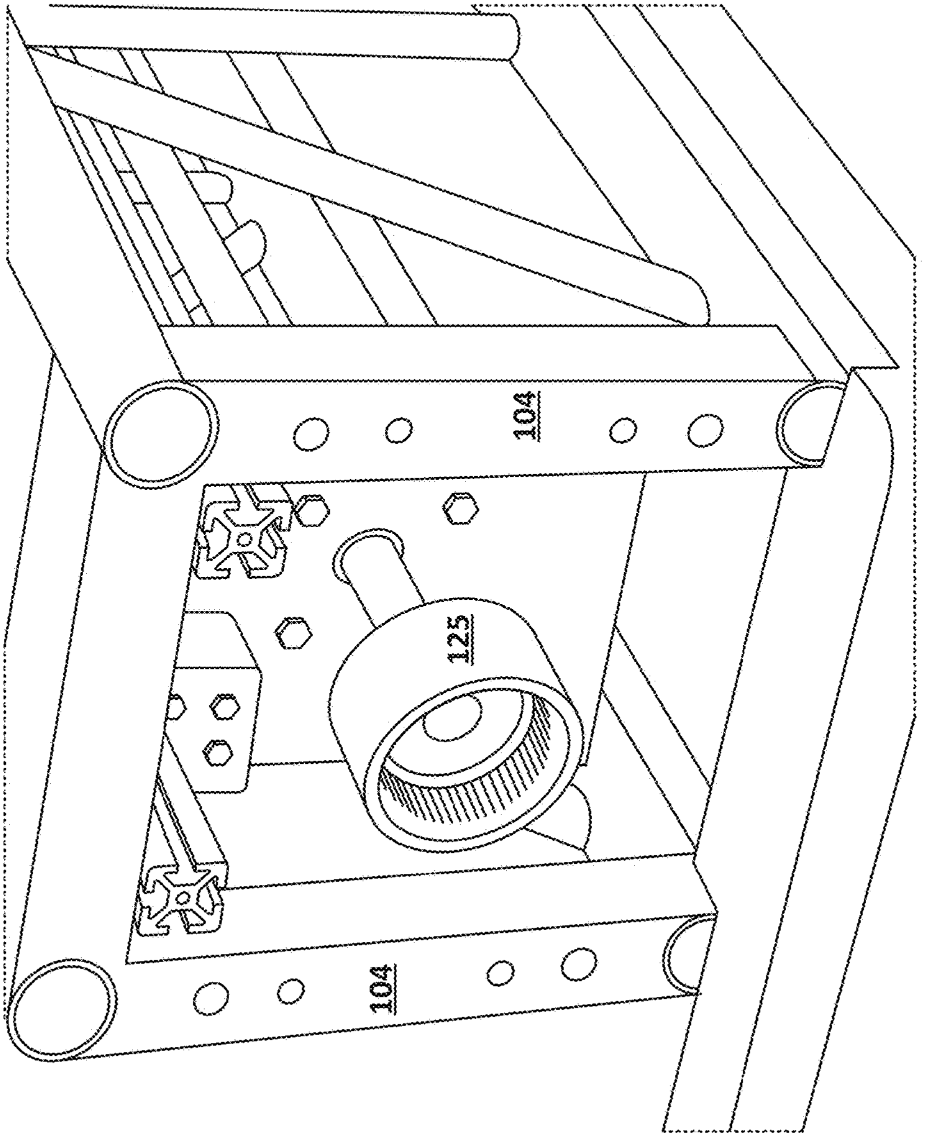
FIG. 11 shows drive shaft coupling mechanism.
Figure 12:
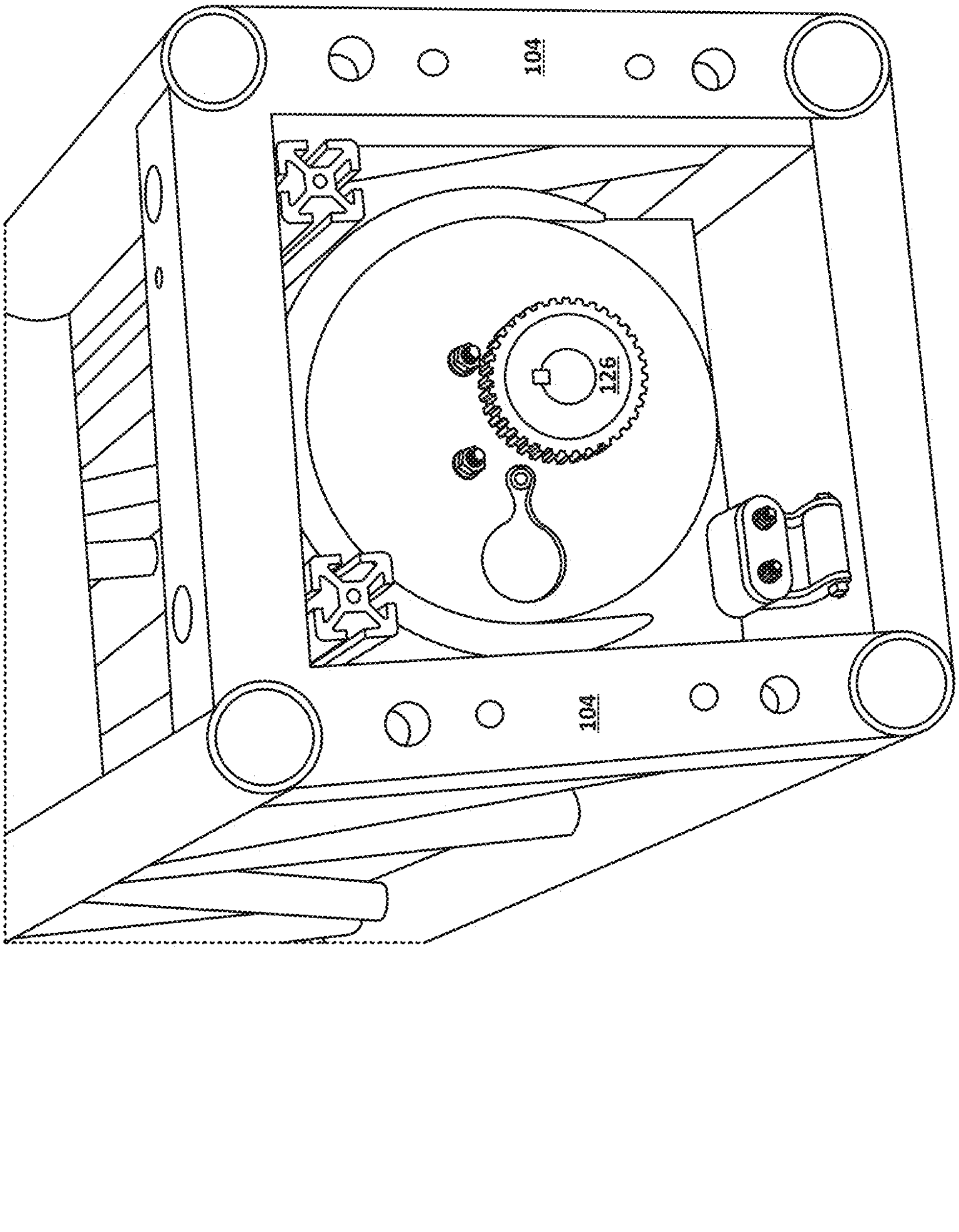
FIG. 12 shows drive shaft coupling mechanism.

Referring to FIGS. 10-12, a shaft coupler assembly 124 is shown. The shaft coupler assembly 124 may include a female portion 125 operably coupled to a first end of a drive shaft 111 of a lift segment 101 and a male portion 126 operably coupled to a second end of the drive shaft 111 of the lift segment 101. The female portion 125 and the male portion 126 may be cooperatively geared such that the male portion 126 may be inserted into female portion 125 whereby rotation of either the female portion 125 or the male portion 126 causes corresponding rotation in the other. As each lift segment 101 has both the female portion 125 and the male portion 126 of the shaft coupler assembly 124, an essentially unlimited number of lift segments 101 may be joined to create any length of modular lift system 100. Further, as noted above, the co-aligning nature of the drive shaft 111 of multiple lift segments 101 via the drive shaft registration groove 118 and shaft registration lock 119 serves to retain the female portion 125 and the male portion 126 in a known state thereby facilitation disconnection and reconnection at a new modular lift system 100 installation site. Further, the only connection that may be required to join a first lift segment 101 and a second lift segment 101 is a set of through-bolts through the truss structure 104 of each lift segment 101. No additional linkages of the drive shaft 111 of the respective lift segments 101 (other than simple insertion of the male portion 126 into the female portion 125) may be required. As such, a slight degree of shaft misalignment may be tolerated by the system in view of the flexibility of the shaft coupler assembly 124.

Figure 13:
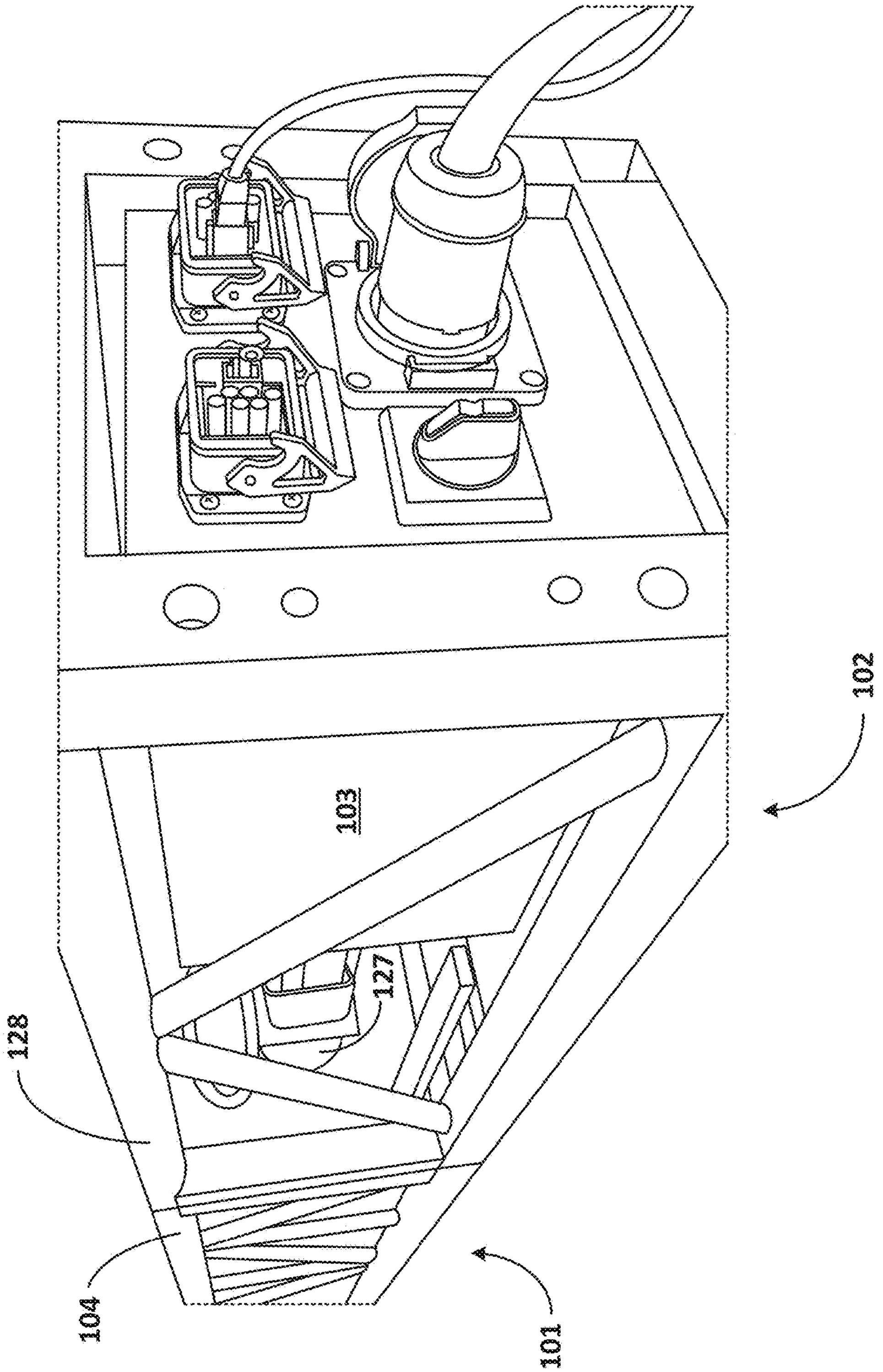
FIG. 13 shows drive motor segment of a modular lift system.

Referring to FIG. 13, a detailed view of a drive segment 102 is shown. Similar to the lift segments 101, the drive segment 102 may include a drive motor coupler 127 which may be connected to either the female portion 125 or the male portion 126 of a lift segments 101. The drive motor 103 may drive rotation of the drive motor coupler 127 to induce corresponding rotation in the drive shaft 111 of one or more lift segments 101. Similar to the coupling between two lift segments 101, the only connection that may be required to join a drive segment 102 and a lift segment 101 is a set of through-bolts through a drive segment truss structure 128 of the drive segment 102 the truss structure 104 of a lift segment 101. No additional linkages of the drive motor 103 of the drive segment 102 to the drive shaft 111 of the a lift segment 101 (other than simple insertion of a male portion 126 of the lift segment 101 into the drive motor coupler 127) may be required. As such, a slight degree of shaft misalignment may be tolerated by the system in view of the flexibility of the shaft coupler assembly 124. Further, the drive motor 103 may employ an absolute encoder which electronically stores and can recall the last rotational position of the drive shaft of the drive motor 103. The storage of the last rotational position combined with the drive shaft registration groove 118 and shaft registration lock 119 of the lift segments 101 allows for all components of the modular lift system 100 to installed in a known state thereby greatly simplifying system setup and initialization.

Figure 14:
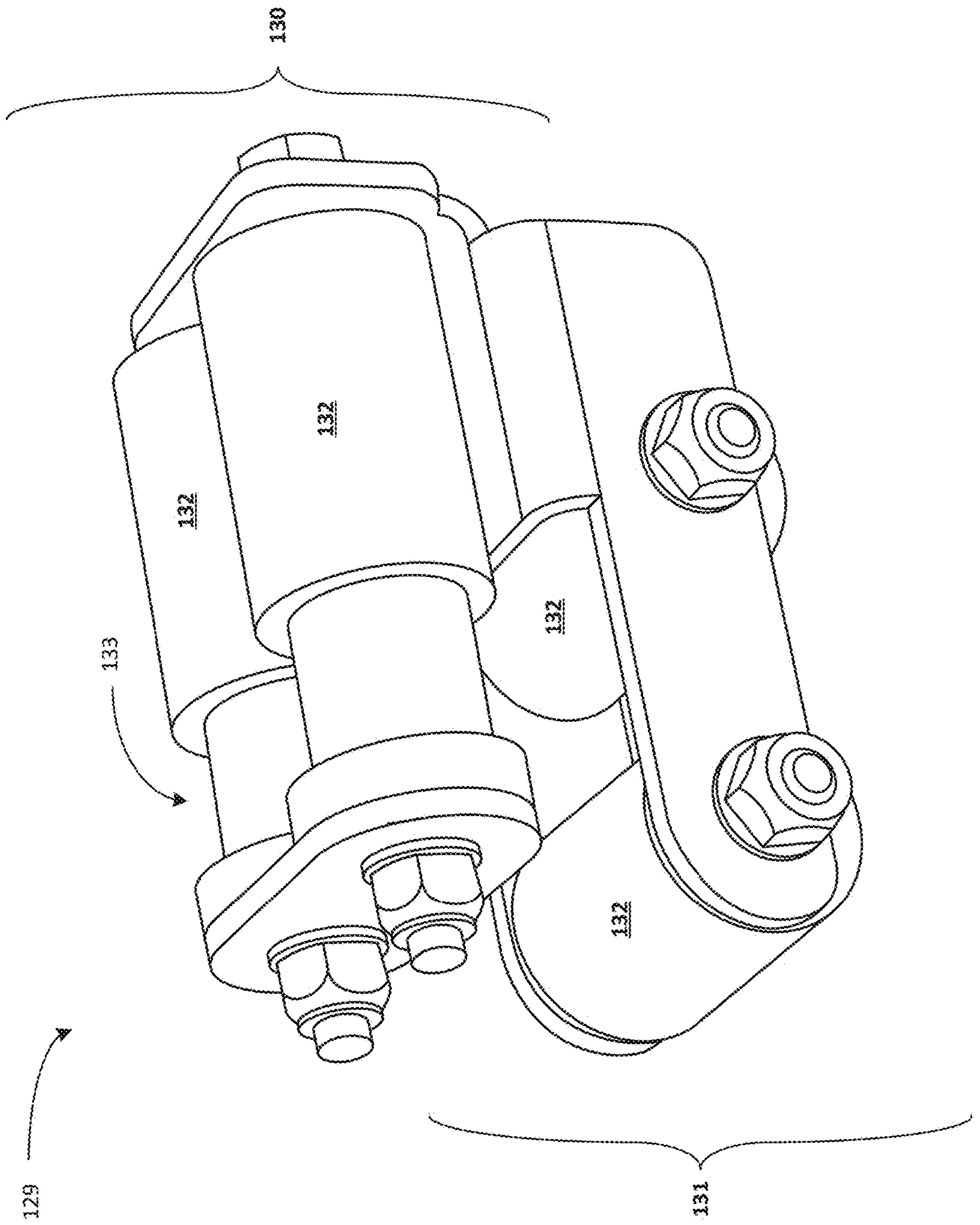
FIG. 14 shows a lift line routing assembly.

Referring to FIGS. 5 and 14, a lift assembly 105 may further include a lift line routing assembly 129 configured to maintain the lift line 113 in an orientation such that it will remain flat when wrapped around the lift line drum 115. The lift line routing assembly 129 may include a top portion 130 and a bottom portion 131. The top portion 130 and the bottom portion 131 may be configured such that one or more routing cylinders 132 of the top portion 130 are perpendicular to one or more routing cylinders 132 of the bottom portion 131. Such a configuration serves to provide bi-directional restriction of lateral movement of a lift line 113. Further, one or more of the routing cylinders 132 may including a routing recess 133. The routing recess 133 may be dimensioned such that a flat, webbed lift line 113 (as shown in FIGS. 5 and 15) will be retained within the routing recess 133 and substantially flat against the routing cylinders 132 thereby ensuring a consistent orientation of the lift line 113 when wrapping around the lift line drum 115.

Figure 15:
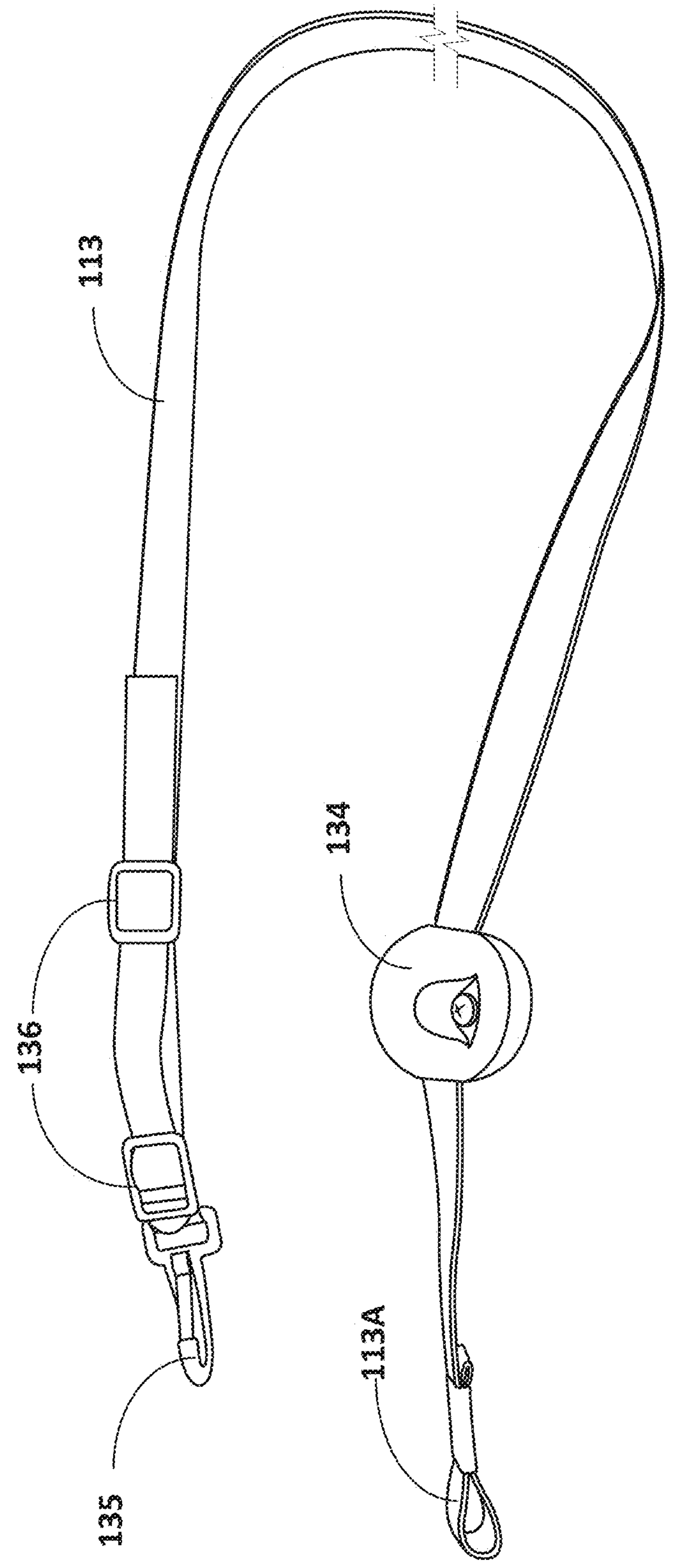
FIG. 15 shows a lift line.

Referring to FIG. 15, a lift line 113 configured for use with an above-described a lift assembly 105 is shown. As noted above, the lift line 113 may have a planar, webbed design such that it will wrap around the lift line drum 115 of a lift assembly 105 in a corresponding flat, consistent manner. The lift line 113 may be constructed of a durable, flexible material such as nylon, Kevlar, and the like. As noted above, the lift line 113 may have a looped portion 113A at one end to engage the lift line anchor pin 116 of the a lift assembly 105.

In one embodiment, such a lift line 113 may be employed in the raising and lowering of large curtain systems, such as those used in large concert or performance settings. Such curtains may be linked to a lift line 113 by a series of D-rings, affixed to the curtain, through which the lift line 113 may be routed. To facilitate installation and removal of such a curtain, one or more ball sliders 134 may be affixed to the lift line 113. The ball sliders 134 may be sized such that they will not fit through the D-rings on the curtain. As such, during installation, operation, takedown, storage and transport of the curtain, the lift line 113 will be retained within the D-rings and cannot slide out. Further, the lift line 113 may include a quick-release clip 135 (e.g., a carabiner-type clip) which may be coupled to any number of objects (e.g., a base bar of a curtain assembly). Further, the lift line 113 may include lift line length adjustment buckles 136 which may be used to easily and quickly adjust the length of the lift line 113.

Figure 16:
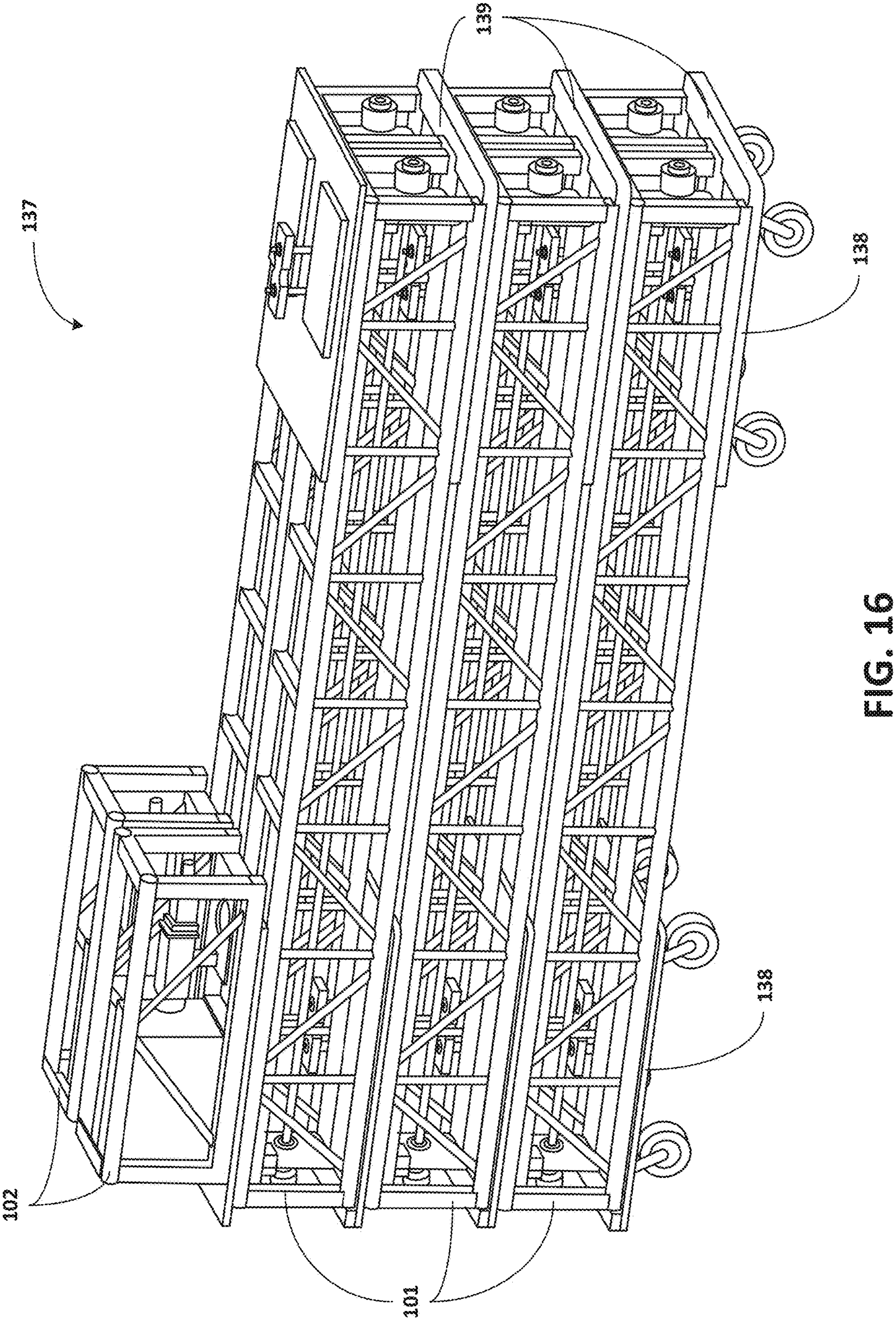
FIG. 16 shows a modular lift system storage/transport system.
Figure 17:
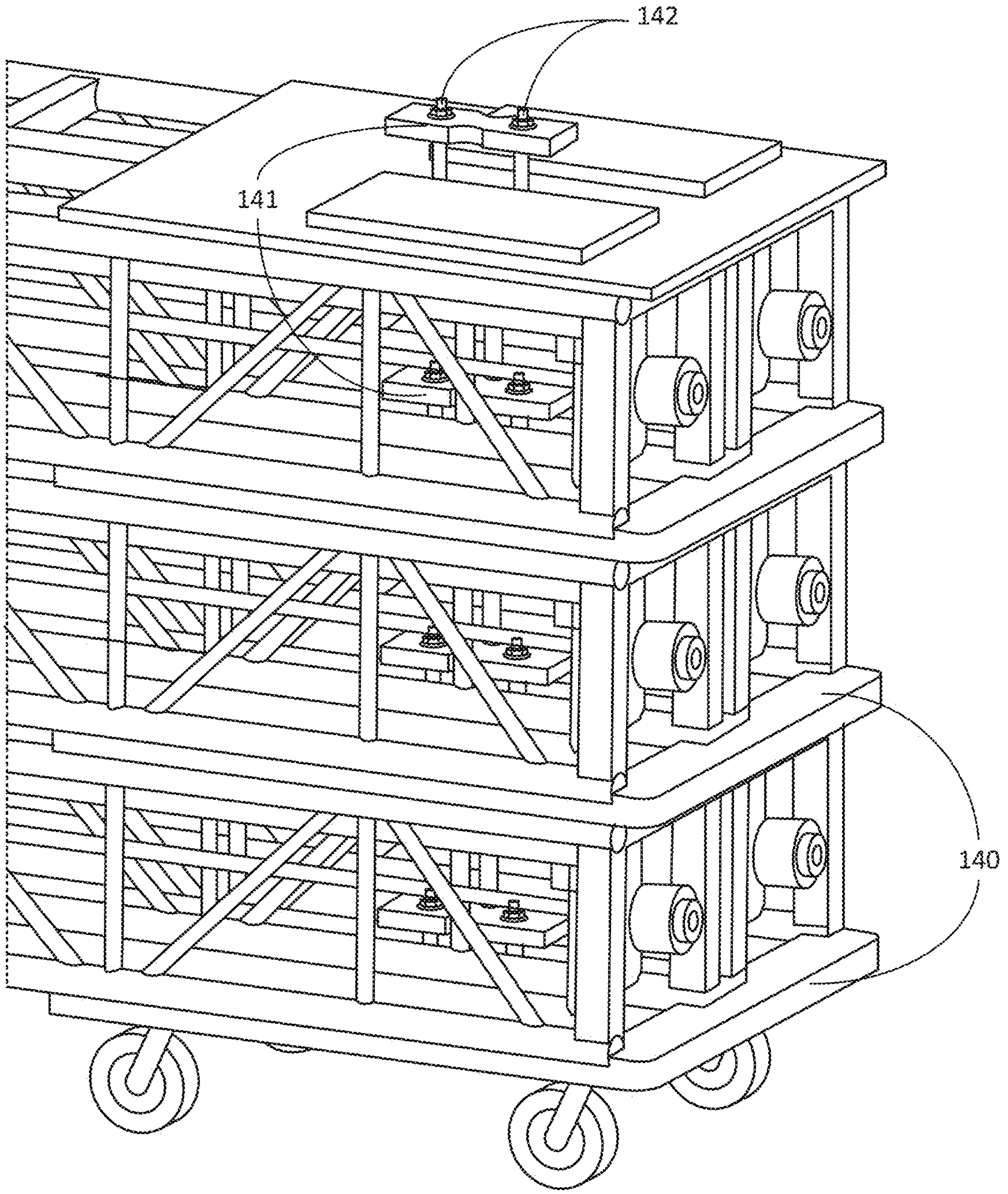
FIG. 17 shows a modular lift system storage/transport system.

In another embodiment, as shown in FIGS. 16-17, a storage/transport system 137 for storage and/or transport of one or more lift segments 101 and/or one or more drive segments 102 forming a modular lift system 100. The storage/transport system 137 may include one or more wheeled caster boards 138 upon which one or more lift segments 101 (e.g., two lift segments 101) may be placed. The storage/transport system 137 may further include one or more stacking platforms 139 which may be placed atop a first row of lift segments 101 and on which a second (and subsequent) row of lift segments 101 or drive segments 102 may be placed.

As shown in FIG. 17, the caster boards 138 and/or the stacking platforms 139 may include one or more end blocks 140. The end blocks 140 may include recessed cut-outs configured to receive the base of a truss structure 104 of a lift segment 101 or the base of a drive segment truss structure 128 of a drive segment 102. Such end blocks 140 serve to restrict lengthwise movement of the lift segments 101 or drive segments 102 relative to the caster boards 138 and/or the stacking platforms 139. Further, the caster boards 138 and/or the stacking platforms 139 may include one or more side blocks 141 supported on one or more projections 142. The side blocks 141 may include recess cut-outs configured to receive a vertical member of a truss structure 104 of a lift segment 101 or a vertical member of a drive segment truss structure 128 of a drive segment 102. Such side blocks 141 serve to restrict sideways movement of the lift segments 101 or drive segments 102 relative to the caster boards 138 and/or the stacking platforms 139.

The storage/transport system 137 may be sized such that the caster boards 138 and the stacking platforms 139 are 30-inches wide (third pack) such that they are easily transportable via standardized shipping means (land, sea, air). The storage/transport system 137 may be further sized to support six 20-foot lift segments 101 (e.g., 120 feet of lift segments 101) and four drive segments 102.

Figure 18:
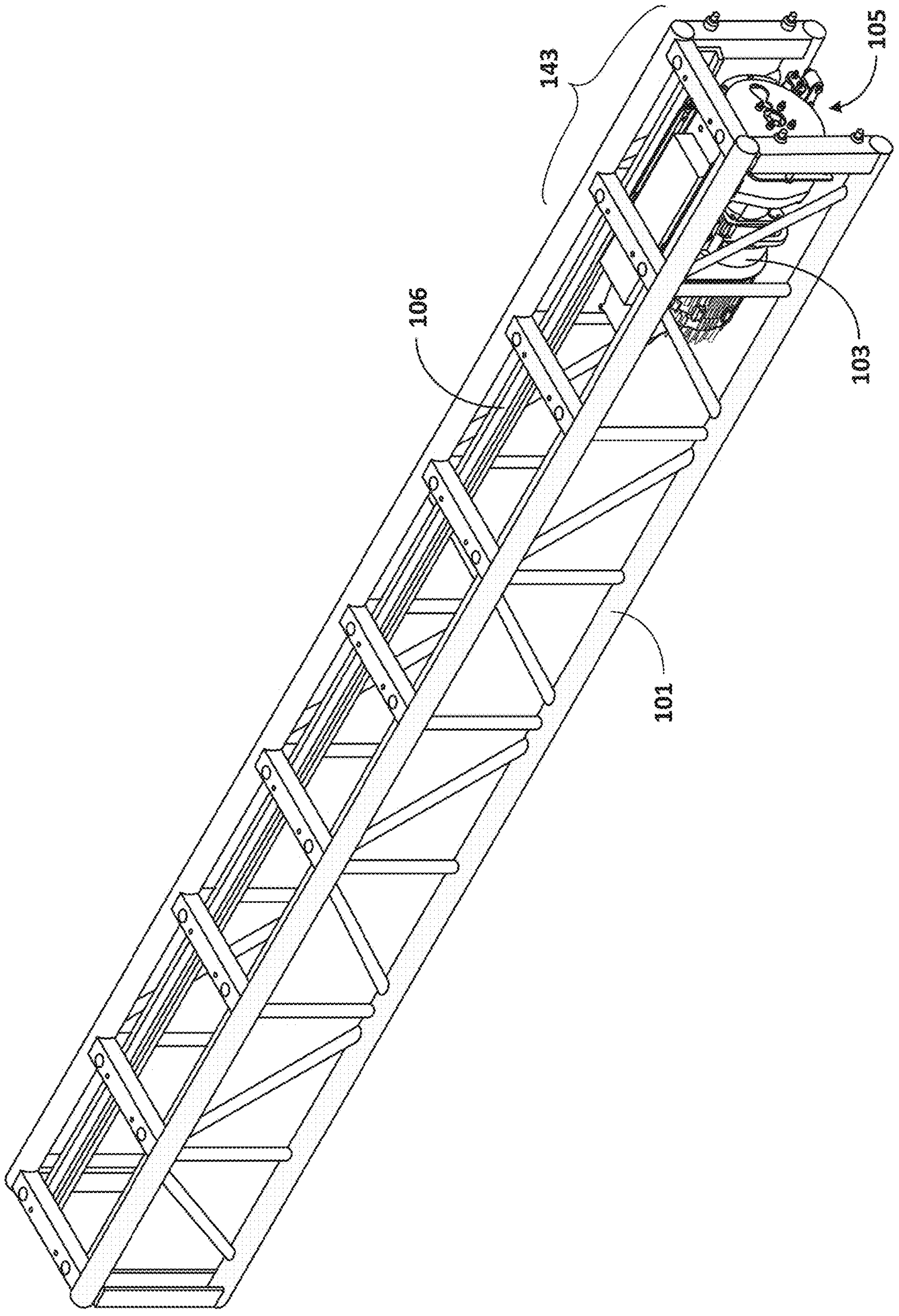
FIG. 18 shows a modular lift system segment.
Figure 19:
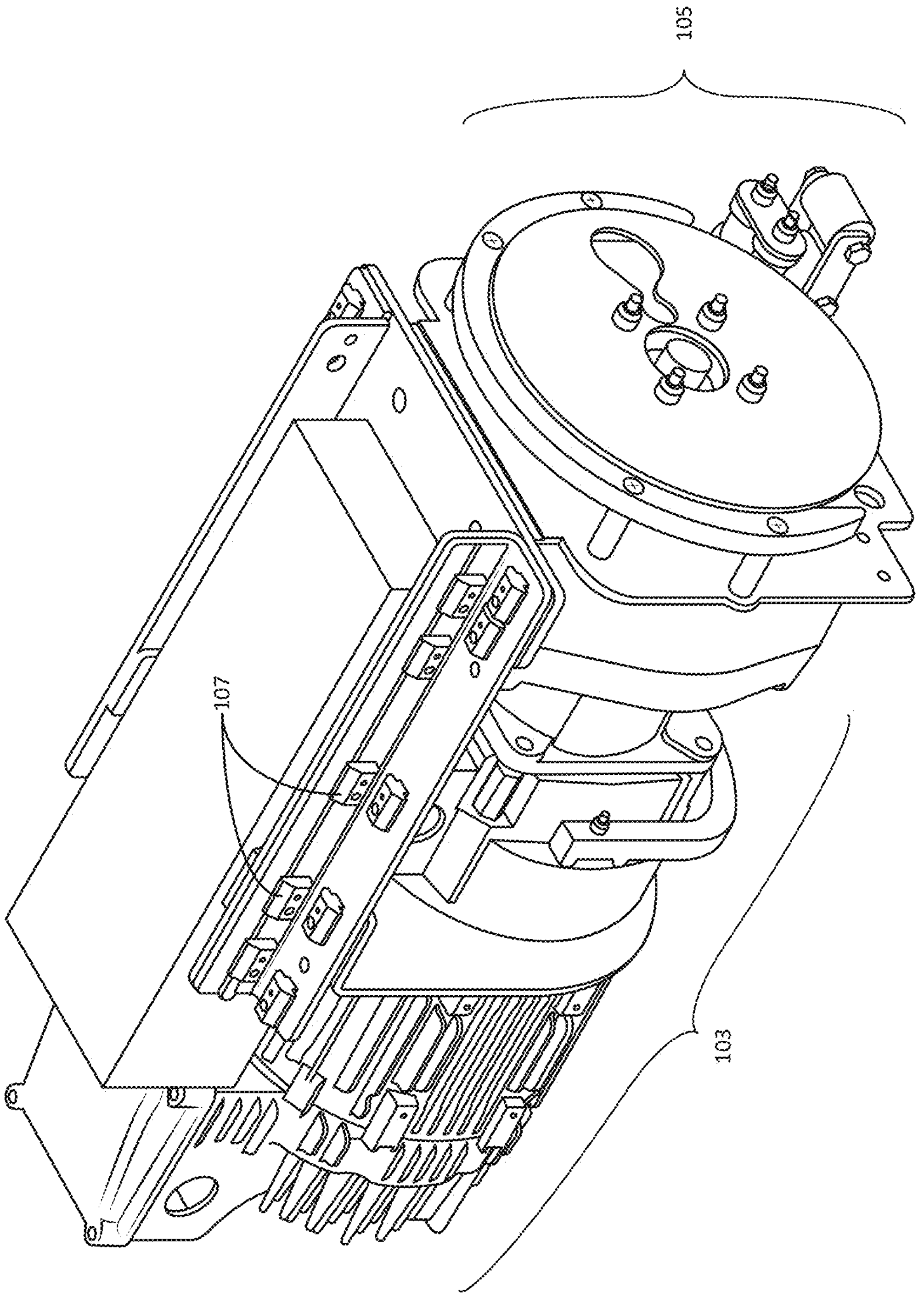
FIG. 19 shows a drive motor with lift assembly.

Referring to FIGS. 18 and 19, in another embodiment, a drive motor 103 may be directly coupled to a lift assembly 105 to form a lift module 143. The lift module 143 may be coupled to the support rails 106 of a lift segment 101 by one or more support rail fasteners 107. Two or more lift modules 143 may be coupled to a common lift segment 101. The drive motor 103 of each lift module 143 may be independently controllable so as to enable movement of the lift line 113 attached to the lift assembly 105 of each lift module 143 at varying rates or in varying directions (as compared to a set of two or more lift assemblies 105 operably coupled to a common drive motor 103 via the drive shaft 111 as in FIGS. 1 and 2).

Figure 20:
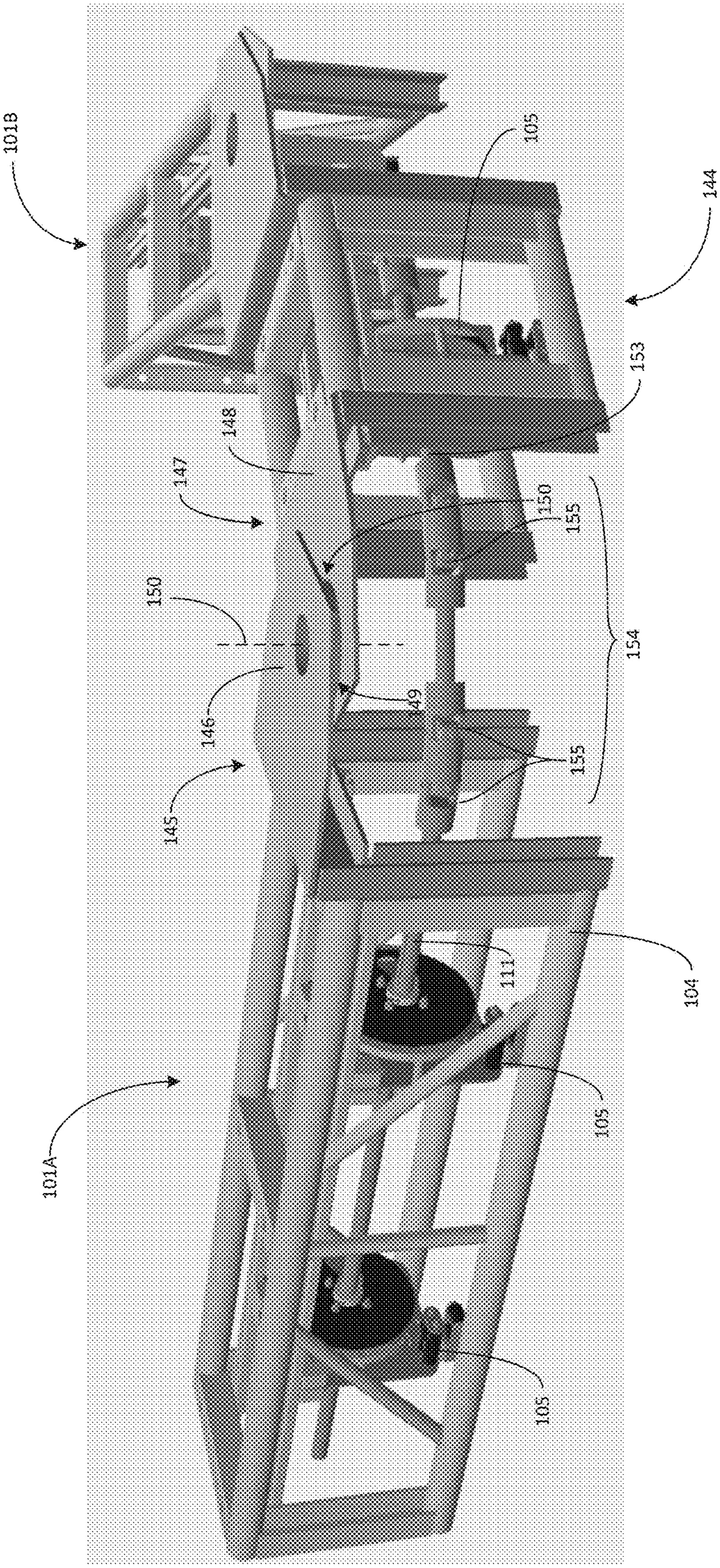
FIG. 20 shows a modular lift assembly including flexible corner portions.
Figure 21:
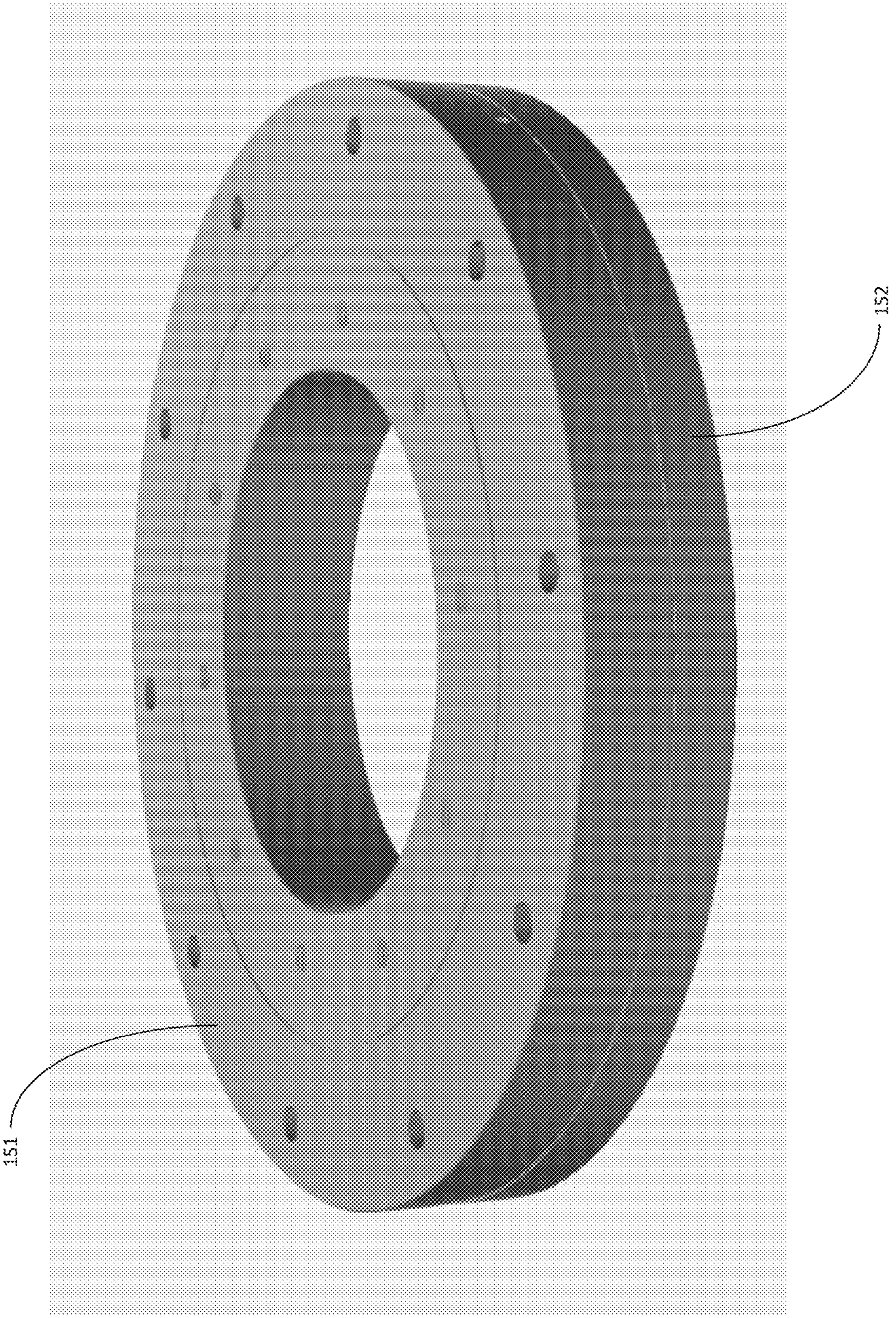
FIG. 21 shows a modular lift assembly including flexible corner portions.

Referring to FIGS. 20 and 21, in another embodiment, the modular lift system 100 may include one or more lift segments 101 (e.g., lift segment 101A and lift segment 101B) including one or more lift assemblies 105 which may be joined by a corner lift segment 144 (which may optionally include a lift assembly 105). For example, a lift segment 101 may include a coupling bracket portion 145 which may be mounted to and end of a truss structure 104 of the lift segment 101. The coupling bracket portion 145 may include a planar projection portion 146 which extends away from the end of the truss structure 104 of the lift segment 101. Similarly, the corner lift segment 144 may also include a coupling bracket portion 147 which may be mounted to the end of the corner lift segment 144. The coupling bracket portion 147 may include a planar projection portion 148.

The coupling bracket portion 145 and the coupling bracket portion 147 may be joined by a bearing system 149 configured to allow for rotation of the coupling bracket portion 145 and the coupling bracket portion 147 with respect to one another about a common axis 150 so as to provide flexibility of the angle between the lift segment 101 and the corner lift segment 144.

Figure 22:
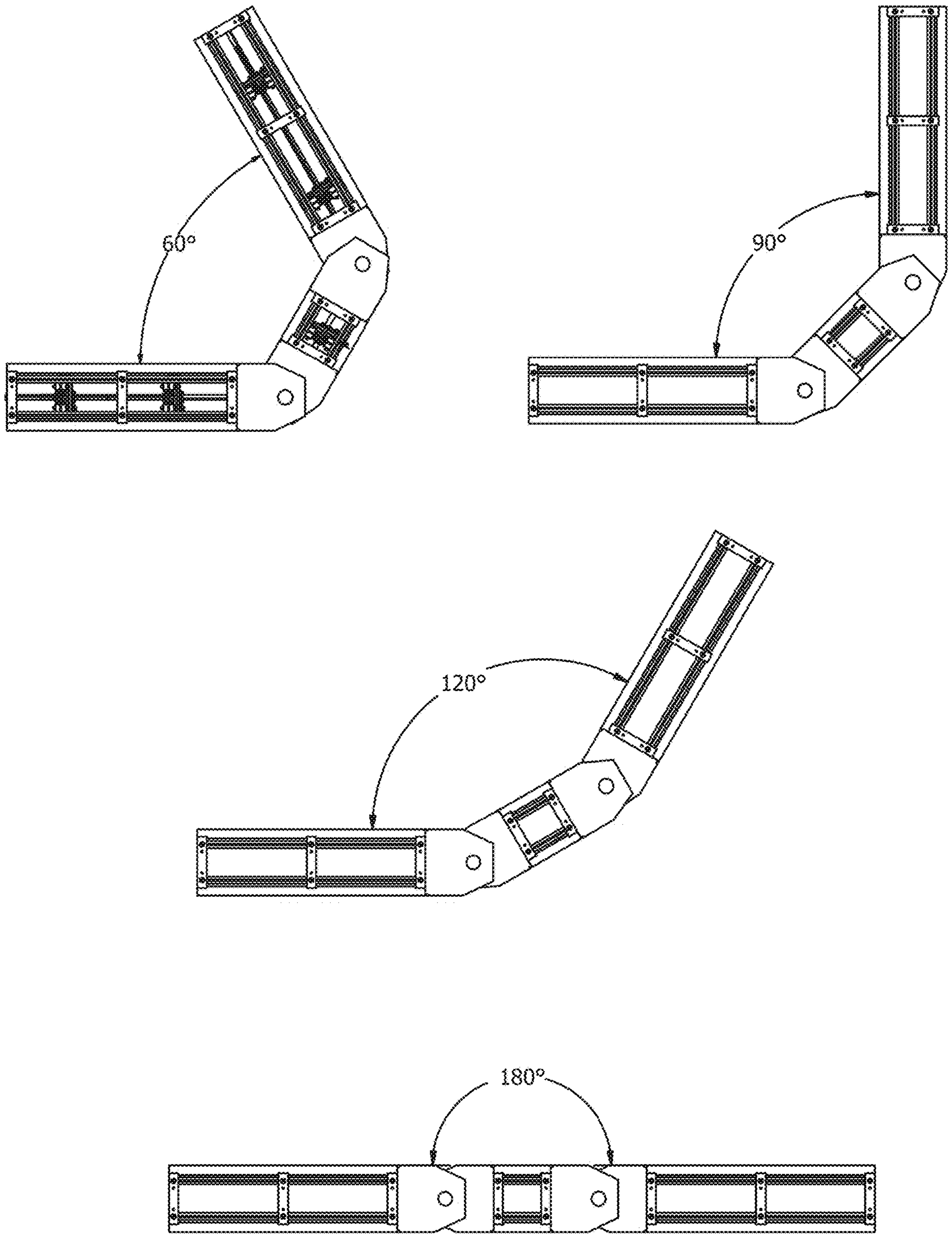
FIG. 22 shows a modular lift assembly including flexible corner portions.

For example, each of the projection portion 146 and the projection portion 148 may each include of a ring structure 151 and a ring structure 152, respectively. The ring structure 151 and the ring structure 152 may include cooperative bearings allowing them to rotate relative to one another. Each of the ring structure 151 and the ring structure 152 may further include cooperating bolt patterns configured to receive one or more bolts to lock the coupling bracket portion 145 and the coupling bracket portion 147 in a desired rotational orientation around the axis 150. For example, as shown in FIG. 22, a lift segment 101A and lift segment 101B may be oriented at angles between 60-degrees and 180-degrees via connection to the corner lift segment 144.

Further, as shown in FIGS. 20, the drive shaft 111 of a lift segment 101 may be coupled to a drive shaft 153 of the corner lift segment 144 via a flexible connection 154. For example, the flexible connection 154 may include one or more double-U joint connectors 155 connected to both the drive shaft 111 of the lift segment 101 and the drive shaft 153 of the corner lift segment 144. Such a flexible connection 154 may allow for the transfer of rotational force from the drive shaft 111 of the lift segment 101 to the drive shaft 153 of a corner lift segment 144 (or vice versa) thereby allowing for coordinated rotation of the respective lift assemblies 105 of the lift segment 101 and corner lift segment 144 via a common drive motor 103 regardless of the relative angles at which a lift segment 101 and a corner lift segment 144 are oriented.

Figure 23:
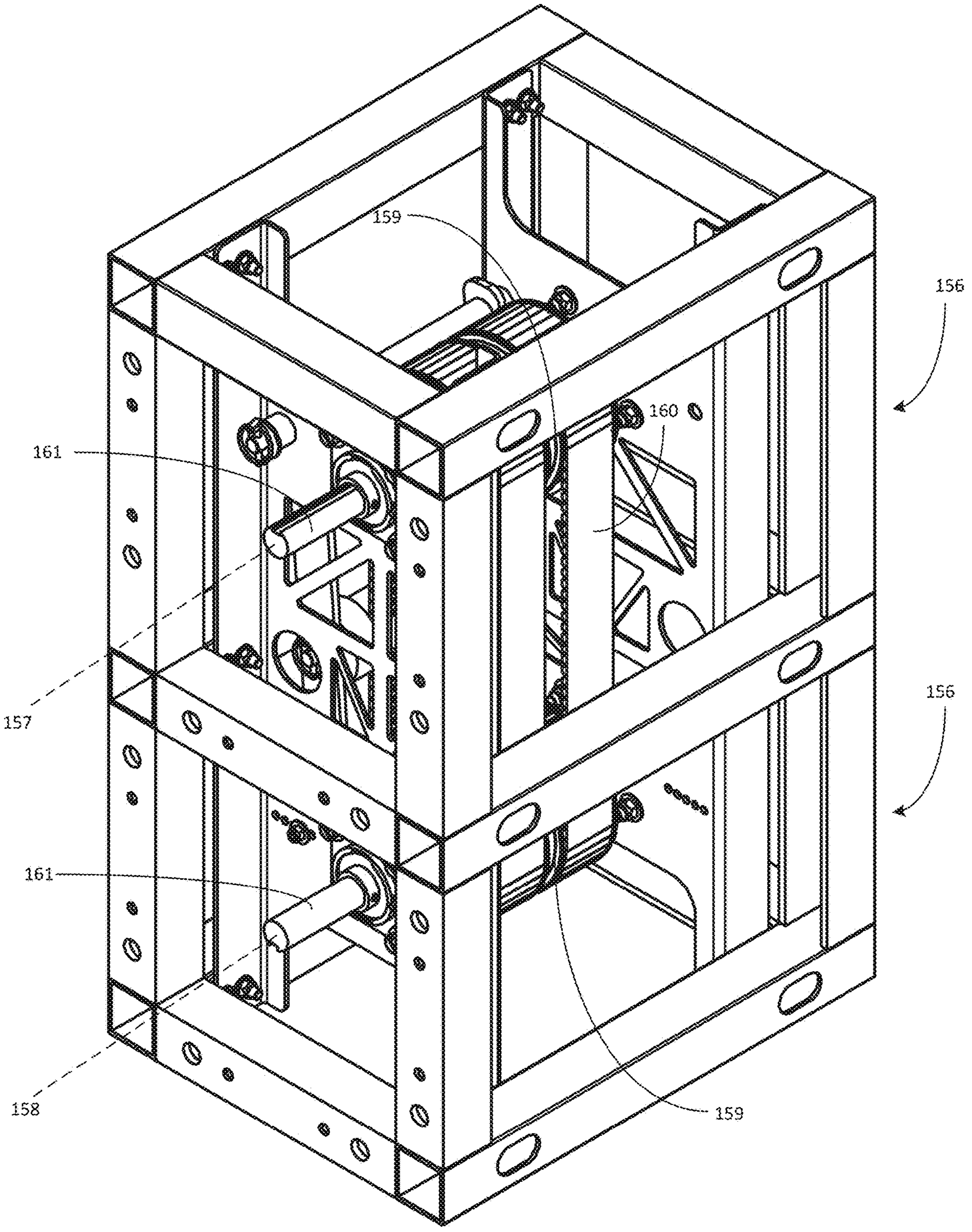
FIG. 23 shows a power transfer unit.

Referring to FIG. 23, the modular lift system 100 may further include one or more power transfer units 156 which may be configured to transfer rotational force from a drive motor 103 of a drive segment 102 associated with a first set of lift assemblies 105 at a first elevation 157 to a second set of lift assemblies 105 at a second elevation 158. Each of the power transfer unit 156 may include one or more drums 159 around which a belt 160 may be routed. Application of a rotational force to a drive shaft 161 of one power transfer unit 156 may induce co-rotation in the drive shaft 161 of the other power transfer unit 156 via the belt 160. Such a configuration may serve to synchronize movements of various lift assemblies 105.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as “top,” “bottom,” “over,” “under,” “upper,” “upward,” “lower,” “down,” and “downward” are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A modular lift system comprising:

at least one lift segment including:

a lift-truss structure;

a drive shaft;

at least one lift assembly coupled to the lift-truss structure, the at least one lift assembly including:

a lift drum operably coupled to and configured to co-rotate with the drive shaft; and a lift line configured to wrap around the lift drum as it co-rotates with the drive shaft, at least one corner lift segment including:

a corner truss structure;

a corner drive shaft;

at least one corner lift assembly coupled to the corner truss structure, the at least one corner lift assembly including:

a corner lift drum operably coupled to and configured to co-rotate with the corner drive shaft; and a corner lift line configured to wrap around the corner lift drum, one or more bracket portions operably couplable to the at least one lift segment and at least one corner lift segment and configured to retain the at least one lift segment and at least one corner lift segment at an angle relative to one another; and a flexible connector operably coupling the drive shaft of the at least one lift segment to the corner drive shaft of the at least one corner lift segment.

2. The modular lift system of claim 1, where in the flexible connector includes, one or more double-U type joints.

3. The modular lift system of claim 1, where in the lift-truss structure and the corner truss structure includes at least one open side free of any intervening truss members.

4. The modular lift system of claim 1, where in the angle is between 60 degrees and 180 degrees.

5. A modular lift system comprising:

a first lift segment including:

a lift-truss structure;

a drive shaft;

at least one lift assembly coupled to the lift-truss structure:

a first power transfer unit operably coupled to the drive shaft of the first lift segment;

a second lift segment including:

a lift-truss structure;

a drive shaft;

at least one lift assembly coupled to the lift-truss structure, a second power transfer unit operably coupled to the drive shaft of the second lift segment; and at least one belt configured to frictionally engage a drum of the both the first power transfer unit and the second power transfer unit such that rotation of the drive shaft of the first lift segment induces co-rotation of the drive shaft of the second lift segment.

* * * * *